Nov. 3, 1931. W. A. BROWN Re. 18,240
COMBINATION BLOWER AND HEATER
Original Filed Oct. 19, 1923 6 Sheets-Sheet 1
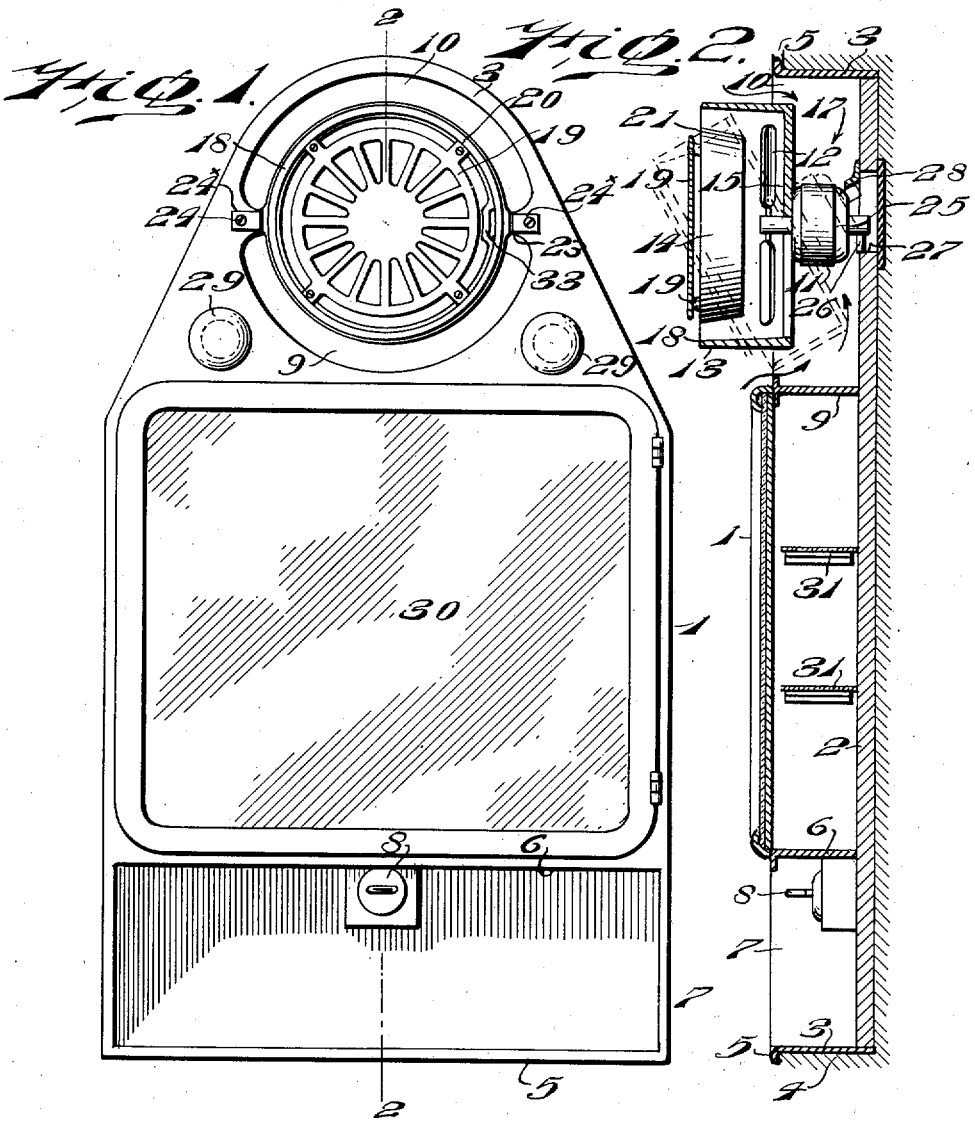
INVENTOR
William Allen Brown
BY
Herbert S. Fairbanks
ATTORNEY Nov. 3, 1931. W. A. BROWN Re. 18,240

COMBINATION BLOWER AND HEATER

Original Filed Oct. 19, 1923 6 Sheets-Sheet 2

INVENTOR
William Allen Brown
BY
Herbert S. Fairbanks
ATTORNEY

Nov. 3, 1931. W. A. BROWN Re. 18,240
COMBINATION BLOWER AND HEATER
Original Filed Oct. 19, 1923 6 Sheets-Sheet 3
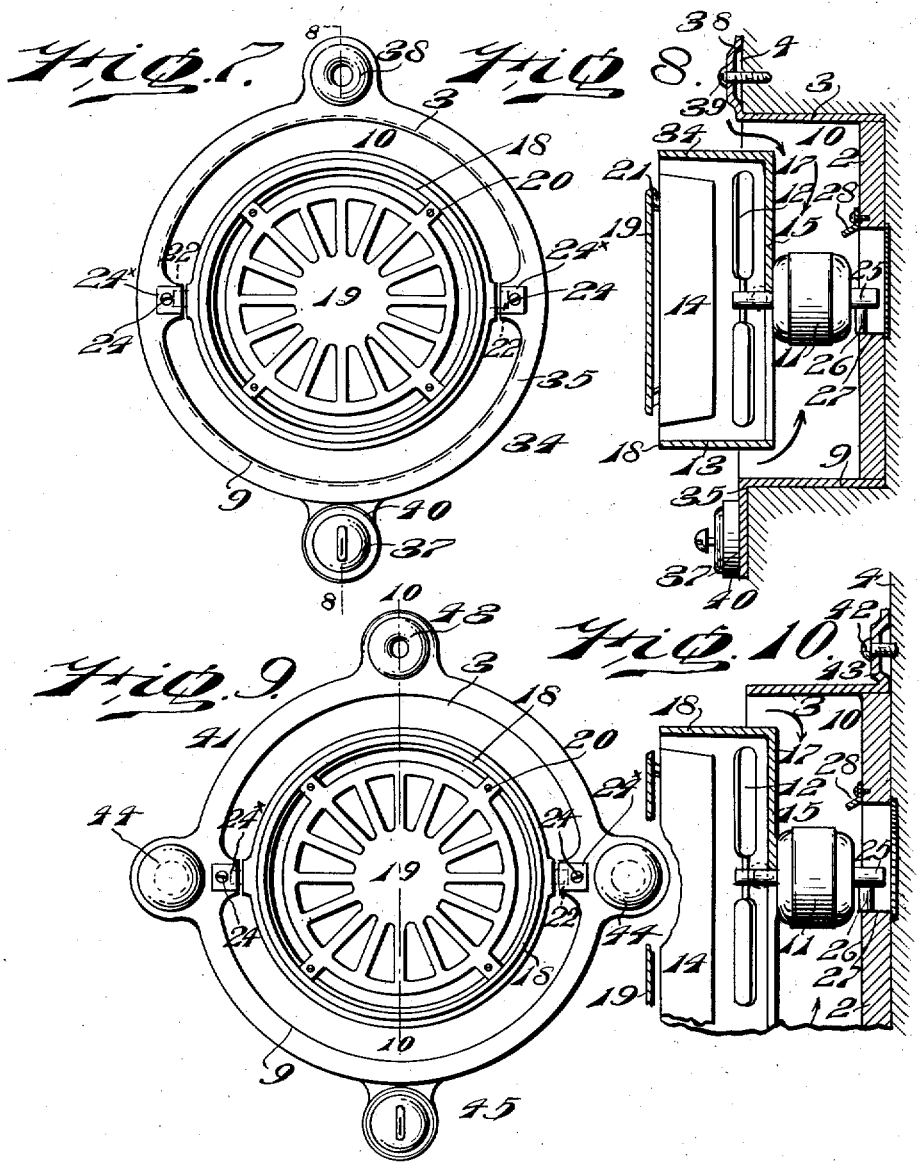
INVENTOR
William Allen Brown
BY
Herbert S. Fairbanks
ATTORNEY Nov. 3, 1931. W. A. BROWN Re. 18,240
COMBINATION BLOWER AND HEATER
Original Filed Oct. 19, 1923 6 Sheets-Sheet 4
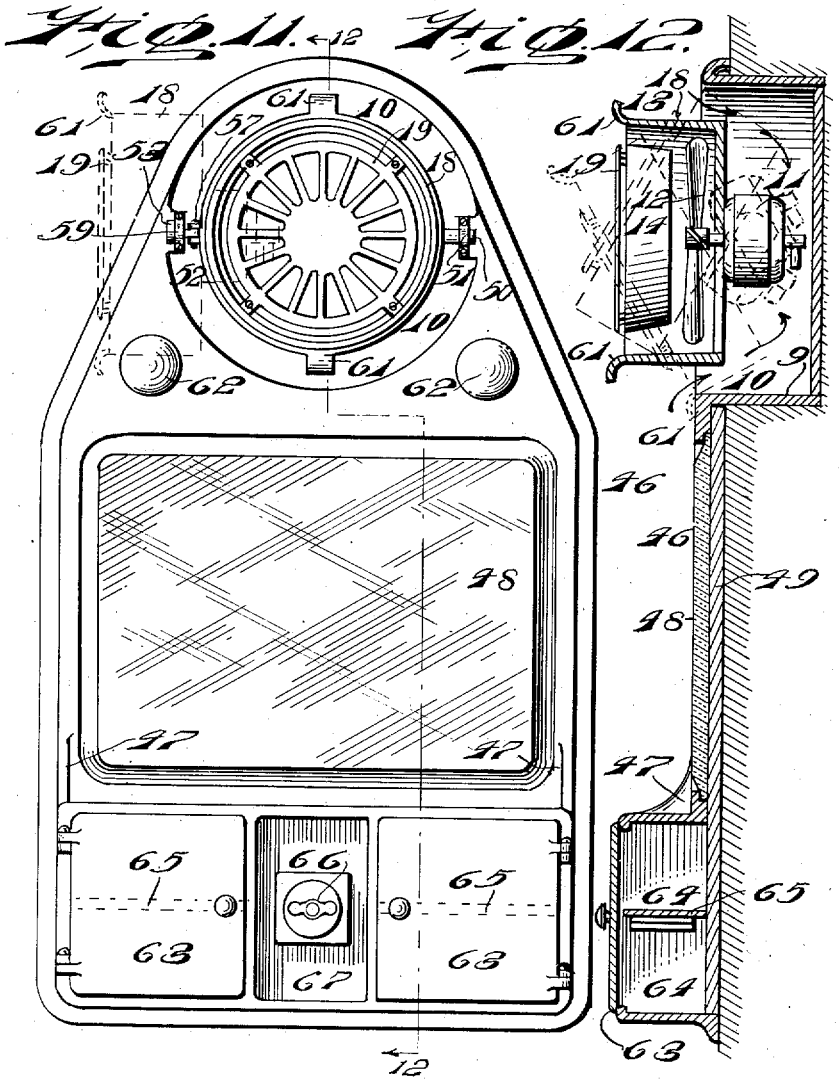
INVENTOR
William Allen Brown
BY
Herbert S. Fairbanks
ATTORNEY Nov. 3, 1931. W. A. BROWN Re. 18,240
COMBINATION BLOWER AND HEATER
Original Filed Oct. 19, 1923 6 Sheets-Sheet 5
Fig. 13.
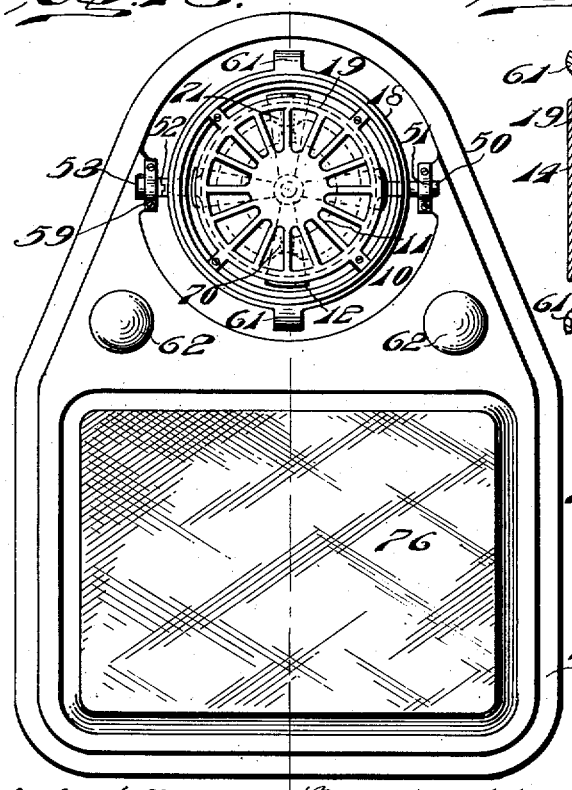
Fig. 14.
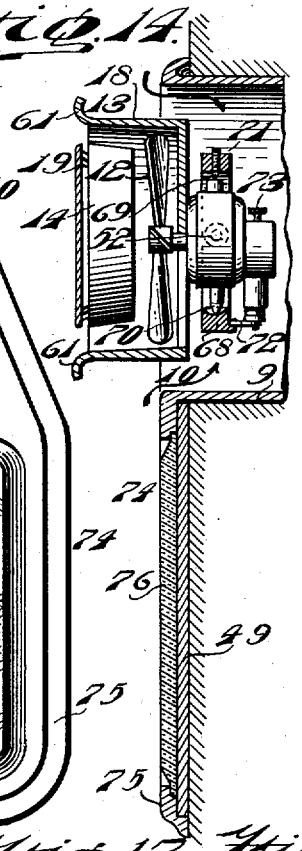
Fig. 15.
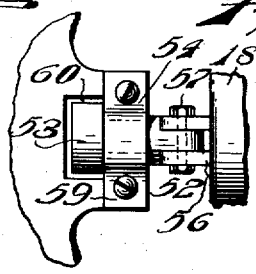
Fig. 16.
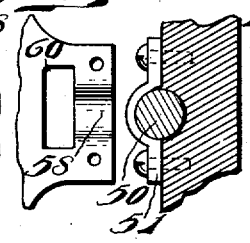
Fig. 17.
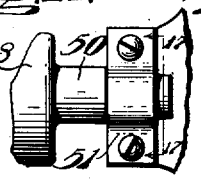
Fig. 18.
INVENTOR
William Allen Brown
BY
Herbert S. Fairbanks
ATTORNEY Nov. 3, 1931. W. A. BROWN Re. 18,240
COMBINATION BLOWER AND HEATER
Original Filed Oct. 19, 1923 6 Sheets-Sheet 6
Fig. 19.
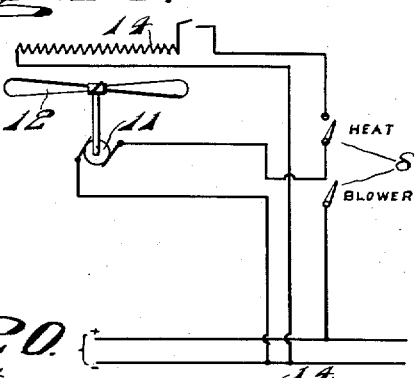
Fig. 20.
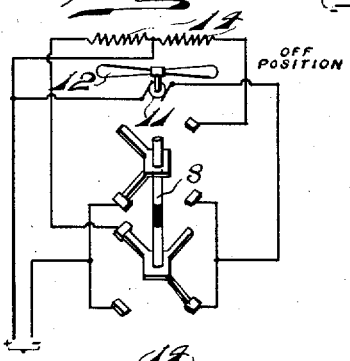
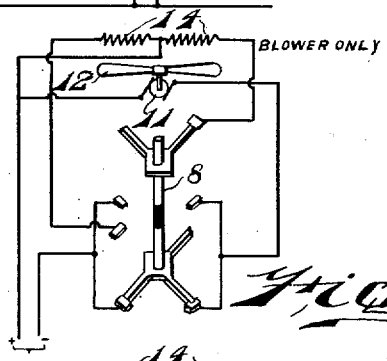
Fig. 21.
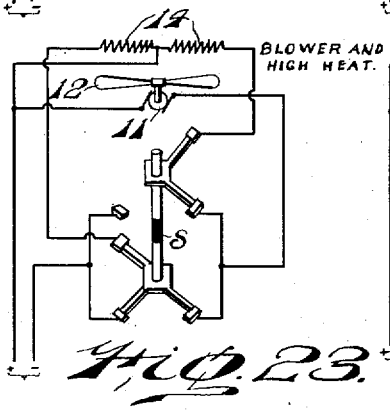
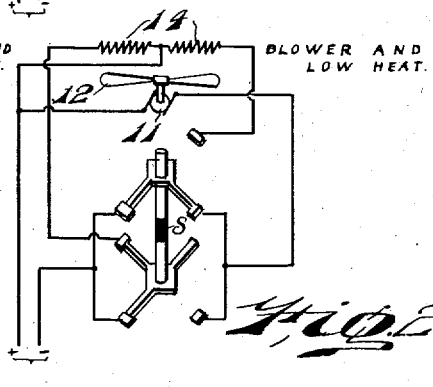
Fig. 22.
Fig. 23.
INVENTOR
William Allen Brown
BY
Herbert S. Fairbanks
ATTORNEY Reissued Nov. 3, 1931

Re. 18,240

UNITED STATES PATENT OFFICE

WILLIAM ALLEN BROWN, OF PHILADELPHIA, PENNSYLVANIA

COMBINATION BLOWER AND HEATER

Original No. 1,627,229, dated May 3, 1927, Serial No. 669,629, filed October 19, 1923. Application for reissue filed May 2, 1929. Serial No. 359,970.

My invention consists of a novel construction of a combination blowing and heating device, which is adapted to be attached to or mounted on a bath room closet, or the like, having preferably a mirror in its lower portion as is customary, the upper portion of said closet being so constructed that the combined heating and blowing apparatus is pivotally mounted therein in such a way, that the blower and heater can be adjusted or tilted forwardly as a unit at an angle, so that by the proper manipulation of the switch or control devices, the blower can be used either alone or in conjunction with the heating element, so that the device can be used either as a blower for cooling purposes or it can be used as a combined blower and heater, or as a drying apparatus for drying ladies' hair or for any other drying or heating purposes desired.

My invention further consists of a novel manner of mounting or assembling the heating and blowing elements, a suitable casing being provided which is secured to the motor casing of the blower, while the heating element is supported from a grid member of novel construction, which is itself supported by the casing attached to said motor casing, whereby the heater and blower can be tilted or adjusted as a unit, to any desired inclination.

It further consists of other novel features of construction and advantage, all as will be hereinafter fully set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of a combination heater and blower, embodying my invention.

Figure 2 represents a section on line 2—2, Figure 2.

Figure 7 represents a front elevation of another embodiment of my invention.

Figure 8 represents a section on line 8—8, Figure 7, showing the unit set into the wall.

Figure 9 represents a front elevation similar to Figure 7, but showing electric lights added.

Figure 10 represents a section on line 10—10, Figure 9, showing the unit secured to the outer surface of the supporting wall.

Figure 11 represents a front elevation of a modification, showing the heating and blowing elements and their adjuncts, as adapted to swing outwardly.

Figure 12 represents a vertical section on line 12—12, Figure 11.

Figure 13 represents a front elevation of my invention mounted on a mirrored support.

Figure 14 represents a vertical section on line 14—14, Figure 13.

Figure 15 represents on an enlarged scale a front elevation of the hinged connection seen at the left of Figures 11 and 13.

Figure 16 represents a front view of the hinge trunnion support.

Figure 17 represents a section on line 17—17, Figure 18.

Figure 18 represents on an enlarged scale, a front view of the right hand trunnion support, seen in Figures 11 and 13.

Figures 19 to 23 represent wiring diagrams showing the control devices in the different positions they may assume.

Similar numerals of reference indicate corresponding parts.

In carrying out my invention, as seen in

Figure 3:
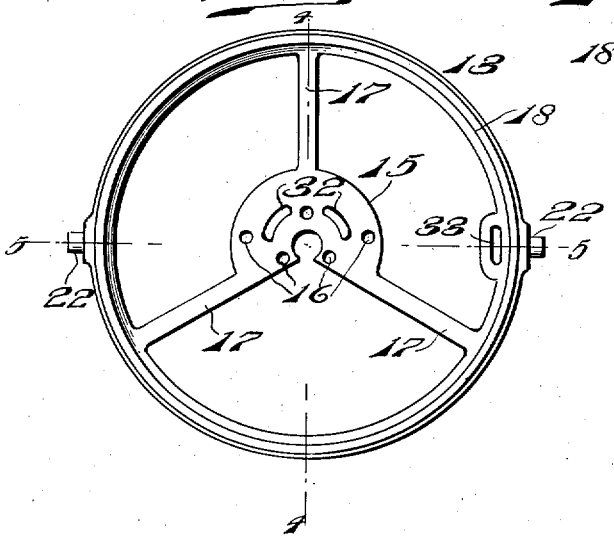
Figure 3 represents on an enlarged scale a plan view of the trunnioned guard casing which is attached to the blower motor casing.
Figure 4:
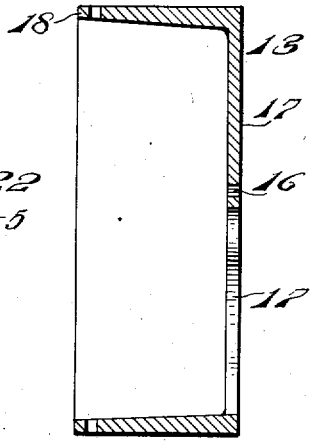
Figure 4 represents a section on line 4—4, Figure 3.

Figures 1 and 2 I construct a cabinet or closet, with the back 2 and the outer member 3, which is adapted to be set into the wall 4 and is provided with the outer beaded portion 5, which gives a neat and attractive appearance to the exterior. Between the lower walls 3 and 6 is formed the lower chamber 7, within which the switch 8 may be located. Between the upper walls 3 and 9 is formed a chamber 10 for the motor casing and its adjuncts. 11 designates the casing of the electric motor, which latter rotates the blower or fan members 12. The enclosing or guard member 13 which surrounds the blower element 12 and heating element 14 has its bottom 15 constructed as seen in Figure 3, and provided with the holes 16 through which pass suitable fastening devices, whereby the rear surface of the bottom or base 15 which is preferably spider shaped or provided with radial arms 17, which are 3 in number, is secured to the front wall of the motor casing 11.

Figure 6:
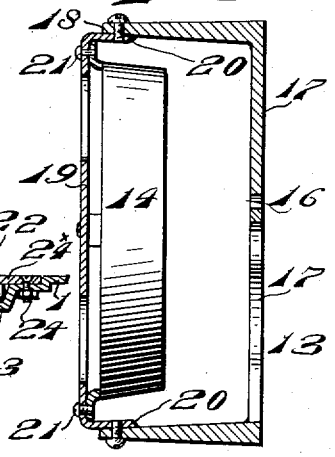
Figure 6 represents a sectional view similar to Figure 4, but showing the grid and heater in position.
Figure 5:
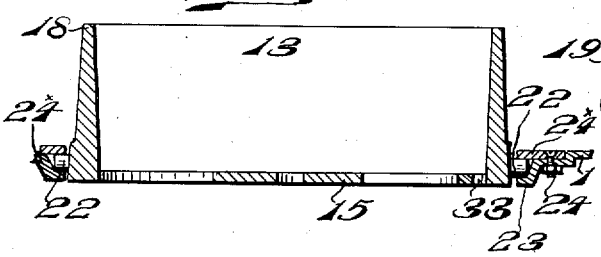
Figure 5 represents a section on line 5—5, Figure 3.

It will thus be seen that the guard member 13 is composed of the base 15, the radial arms 17 and the outer annular wall 18, whereby a very rigid and durable structure is provided, from which the heating element 14 is supported in the following manner. 19 designates an outer grid having the inwardly deflected lips 20, which are secured to the outer inner surface of the annular wall 18. 21 designates fastening devices common to the grid 19, and the heating member 14 as will be understood from Figures 2 and 6. The wall 18 is provided with the oppositely located trunnions 22, which are seated in suitable bearings 23 as will be understood from Figure 5. It will thus be seen that the front of the motor casing 11 is secured to the back of the wall 15, while the heater element 14 is supported from the grid member 19, which is supported by the attachment of the tongues 20 to the wall 18 as seen in Figure 6. By reason of the foregoing construction, it will be apparent that the blower element 12, the heater element 14 and the guard casing member, composed of the annular wall 18, arms 17 and the central base member 15 are enabled to be rocked or tilted as a unit from the position seen in full lines in Figure 2, into the position seen dotted in said figure, or into any intermediate position. The parts can be secured in the desired adjusted position by tightening the screws 24, which will cause the plates 24x to bind tightly upon the contiguous trunnions 22, as will be apparent from Figure 5, it being understood that the construction seen in Figure 5 is duplicated at each side of Figure 1. It will thus be apparent that the tightening of the screws 24 will secure the heater and the blower and their adjuncts in any desired position. From the rear hub 25 of the motor depends the pendant member 26, which when the parts are in the position, as seen in full lines rests upon the wall 27, and serves to hold the parts in horizontal position, as seen in full lines. The upper stop or abutment 28 arrests the movement of the parts, when they assume the position seen in dotted lines in Figure 2 and said stop assists the frictional devices seen in Figure 5 in holding the parts in the position seen in dotted lines in said figure. 29 designates a pair of electric light bulbs, which may be located in the approximate positions seen in Figure 1. The electric light bulbs as well as the blower element 12 and the heater element 14 may be controlled by the switch 8 which controls the heater and blower, so that the heater element and the blowing element may function independently or simultaneously as may be desired. The electric lights 29 can either be controlled by the switch member 8 as stated, or may be independently controlled by pull chains of the usual character. If desired the electric lights 29 can be dispensed with. It will be seen from the foregoing that my device constitutes a very useful adjunct to the usual medicine cabinet or closet or mirrored support in a bath room, or the like, since such a closet equipped at its upper portion with novel devices of this character, enables the user to keep the bath room cool in hot weather, and in cold weather it permits the room to be heated by the heater element, since heat from the heater can be instantly diffused throughout the room from the heater element 14 in the desired directions. The device also constitutes a very useful toilet appliance, as it can be used for drying hair and for other drying purposes, as is evident.

It will be understood that the cabinet or closet 1 may be equipped with a mirror 30 and shelves 31 as is customary. I have deemed it unnecessary to show the wiring connections intermediate the switch 8, the motor casing 11, and the heater element 14, as these may be connected up in any suitable manner by any electrician as will be apparent to those skilled in the art. I preferably provide the base 15 with the ventilating ports 32 seen in Figure 3, and the wires may pass through the slot 33, seen in Figures 1 and 3 to the blower and heater which slot serves to guide and support them. Another embodiment of my invention is illustrated at 34 in Figures 7 and 8 wherein the annular casing 35 is provided, within which the blowing and heating elements and the outer grid member are supported substantially as already described with respect to the upper portions of Figures 1 to 6. This device may be provided with the switch 37 and constitutes a small, self-contained fixture, which can be readily secured to the wall of the bath room or other rooms of a house or an apartment, and constitutes an efficient, small, readily portable element, having blowing and heating devices, which are pivotally supported as already described. The coacting heating and blowing elements in the rear of the grid member 19 seen in Figures 7 and 8 are of the same construction as already described with respect to the other figures and a further description thereof will be unnecessary. While my novel device has been shown as especially adapted to a bath room, it can obviously be used in other locations and for various purposes other than those referred to.

In the construction seen in Figures 7 and 8, I have shown at the upper portion of the annular casing 35, a boss 38, having a hole therein through which passes a screw or other fastening device 39, which enters the wall 4, and affords a convenient means for securing the fixture in position in an annular recess in said wall. The boss 38 is diametrically opposite to the boss 40, carrying the switch 37, so that the entire design or front of the fixture has a neat, symmetrical and attractive appearance.

In the construction seen in Figures 7 and 8, I have shown the fixture as adapted to be set back into or embedded in the wall 4, substantially as seen in the upper portion of Figure 2. In Figures 9 and 10, I have shown a fixture 41, substantially similar to the fixture 34, seen in Figure 7, but said fixture 41 is adapted to be placed directly against the wall 4, and supported with respect thereto by the screw or other fastening device which passes through the upper boss 43. In the structure 41, seen in Figure 9, I have shown a pair of electric lights 44, oppositely disposed upon the horizontal median line of the device. The boss 43 is in the same vertical line as the boss 45, so that the two bosses 43 and 45 and the electric lights 44 are symmetrically positioned upon the fixture 41, so that a graceful and symmetrical appearance is imparted thereto. In all the structures seen in Figures 1, 2, 7, 8, 9 and 10, it will be apparent that the front of the motor casing 11, is secured to the back of the wall 15 of the guard element 13, and that the outer grid 19, is in each instance secured to the annular wall 18, of said guard element 13. The electric heater 14, is in each instance, secured to the inner wall of the grid 19, and the elements 19, 14, 12, 11, and 13 are enabled to be rocked or tilted as a unit and the unit is in each instance secured in the desired adjusted position by the tightening of the screws 24, or their equivalents. It will be apparent that by making the back of the guard element 13, of a skeleton construction or composed of the members 15 and 17, as seen in Figure 3, the weight of the device is reduced to a minimum and ample provision is made for the necessary cooling of the various elements. The front wall of the cabinet 1, seen in Figures 1 and 2, as well as the grid 19, can be enameled white, so as to give a pleasing and sanitary appearance to the entire device and the front wall of the annular casings 34 and 41, as well as their grids 19, can also be enameled white so as to impart an attractive appearance to the entire structure. The blower or cooling element composed of the members 11 and 12 may be any standard or conventional fan now on the market, and can be readily adapted for high, low, or intermediate speeds, according to requirements. The electric heater 14, may be composed of one, two or more electrically heated elements, and may be provided with means for utilizing a single element or a plurality of heating elements which may be energized singly or simultaneously, either alone or in conjunction with the high, low, or intermediate speeds of the blower. As the wiring for this apparatus can be constructed or connected up by any electrician skilled in the art, I have deemed it unnecessary to describe the same in detail.

The construction seen in Figures 1 and 2 is especially adapted as a bath room fixture but it will be evident that it can be used in other locations, while the construction seen in Figures 7 to 10, can be readily installed in a bath room or other room of a house or apartment in any desired location. It will be apparent that the construction seen particularly in Figures 9 and 10 is readily adapted for installation at any desired point, since it can be hung or suspended from any wall at any point. It will be apparent that if desired, the heating element 14 can be omitted since in tropical countries this element would not be necessary. I preferably, however, collocate the heating and blowing elements in substantially the manner seen, since, thereby my novel structure is readily adapted to all climatic conditions in any climate or latitude as is evident.

It will be apparent that the chamber 10, seen in Figures 2, 8, 10, 12, and 14 to be hereafter referred to performs an important function in effecting the cooling of the fan or blower element, since the space between the outer walls of the chamber 10, and the guard element 13, permits the ingress and flow of air, as indicated by the arrows, so that a positive circulation of air around the motor is provided for, thereby keeping said motor cool at all times, which is very desirable in devices of this character, since if the motor becomes overheated, it will be liable to be seriously damaged.

In the construction seen in Figures 11 and 12, I have shown a mirrored support 46, for the blowing and heating elements, said support comprising the outer casing or frame 47, in which the mirror 48 is secured against a suitable backing 49. In the upper portion of the device is the air circulation chamber 10, and the grid 19, heater 14, blower 12, motor 11, and guard member 13 comprising the outer casing 18 are assembled in substantially the same manner as already described with reference to Figures 1 to 6. In Figures 11 and 12, however, I have made provision for the blowing and heating elements to be adjusted into their extreme upper and lower positions, and I also make provision for hinging the blowing and heating elements and their adjuncts, so that they may be swung out laterally for the purposes of inspection or repair. The annular wall 18, has a right hand trunnion 50, which is held in its bearing by the trunnion cap 51, see Figure 18. The opposite or left hand side of the annular wall 18 is provided with the hinge member 52, composed of the head 53, trunnion 54, and male member 55, which is held in pivotal connection with the female member 56 by the bolt or pin 57, the female member 56 being carried by the guard member 18, and positioned therein diametrically opposite to the trunnion 50. The left hand trunnion 54 is held to its bearing 58, see Figure 16, by the cap 59, and the head 53 is located in the recess 60, as will be understood from Figures 15 and 16. The upper and lower lips or hooks 61, afford a convenient means for rocking the heating and blowing elements into their extreme upper and lower positions as seen in dotted lines in Figure 12, and said hooks further serve as stops to limit the extreme movement of said heating and blowing elements.

When it is desired to have access to the heating or blowing elements, it is only necessary to remove the right-hand trunnion cap 51, and to grasp either of the hooks 61, whereupon the parts can be readily swung into the position seen dotted at the left of Figure 11.

Electric lights 62 may be employed, positioned as seen in Figure 11, and doors 63, can be employed for closing the compartments 64, provided with the shelves 65. The switch 66 for controlling the heater, blower and lights, if desired, can be positioned in the chamber 6 intermediately of the compartments 64, or said switch can be located at any other convenient point.

In Figures 13 and 14, I have shown another embodiment of my invention, wherein the grid, heater, blower, and guard elements, 19, 14, 12, 11 and 13, are collocated substantially as already described, as are also the hinge and trunnion elements described with reference to Figures 11, 12, and 15 to 18. The hinge and trunnion elements, seen in Figures 13 and 14, are however, diametrically positioned on the ring 68, best seen in Figure 14, and the motor 11 seen therein is supported on upper and lower pivot points 69 and 70, the upper pivot point being adjustable and being formed at the bottom of the screw 71. This construction permits the automatic lateral oscillation of the heating and blowing elements by reason of the link connection 72, which can be thrown into or out of operation by the manipulation of the finger piece 73. This is a standard construction in certain types of fans and need not be described in detail, as it may conform to the construction seen in a prior patent to W. A. Brown. While this fan oscillation, per se, is not new, I am the first to employ it in connection with a device of the character stated. The structure seen in Figures 13 and 14, provides for the automatic oscillation of the blowing and heating elements and in addition permits the lateral swinging thereof to any side, as already explained with reference to Figures 11 and 12. I have shown the blowing and heating elements in Figures 13 and 14 as mounted on a mirrored support 74, composed of the frame 75, having the mirror 76, therein positioned against the backing 49, already described.

The various forms of mirrored supports seen in Figures 1, 2, 11, 12, 13, and 14, have great utility and coact with my novel heating and blowing elements, particularly when my devices are used by women in drying their hair after washing it, as is evident.

The oscillating device seen in Figure 14, can of course be used in the constructions seen in Figures 2 and 12, and the mirrored support seen in Figures 13 and 14 can obviously be employed in lieu of the cabinet or closet construction, seen in Figures 1, 2, 11 and 12, if desired. The switches seen in Figures 1 and 11 may obviously be placed on any other part of the device or at any other convenient points on the wall of the room in which my novel device may be located.

It will be obvious that the pivotal points or trunnions 22 may be positioned forward or back on the guard element 18, so that a true balance is provided between the motor and its adjuncts and the heater and its adjuncts, and the electric heater elements may or may not be in a metal body, as is evident.

It is clearly evident that any form of the device shown may be adapted to be set in the wall or on the wall of the room in which it is to be used.

In the wiring diagrams seen in Figures 19 to 23 I have shown the heater, blower and the control devices therefore in the various positions which the latter may assume as will be evident to those skilled in the art. In Figure 19 I have shown the control for the heater and the blower. In Figure 20 I have shown the off position of the various parts. In Figure 21 I have shown control devices operating the blower only. In Figures 22 and 23 I have shown the control devices as operating the blower with low heat and the blower with high heat respectively.

It will now be apparent that I have devised a novel and useful construction of combination blower and heater, which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a support having its walls closed except its front wall, a combined heating and blowing device pivotally mounted in said chamber, a motor in said chamber to drive the blower, a guard surrounding the heater and blower and forming a discharge passage, there being a rearwardly extending air inlet for said chamber surrounding said guard whereby air circulated passes around said motor to cool it, and switching means for running the blower alone or simultaneously with the heater.

2. In a device of the character stated, a support having a chamber, the rear, top, bottom and side walls of which are closed, and the front wall of which is opened, a combined heating and blowing device pivotally mounted in said chamber, means to fix said device in the position to which it is adjusted, a motor in said chamber to drive the blower, a guard contributing with the wall of said chamber to form a rearwardly extending air inlet and provided with a forwardly extending air discharge whereby air circulated passes around the motor to cool it, and switching means for running said blower alone or simultaneously with the heater.

WILLIAM ALLEN BROWN.